United States Patent [19]

Nakatani et al.

[11] Patent Number: 5,262,851
[45] Date of Patent: Nov. 16, 1993

[54] FACSIMILE APPARATUS CAPABLE OF DISTINGUISHING THE COMMUNICATION FROM A PARTICULAR TRANSMITTER

[75] Inventors: Munehiro Nakatani, Toyohashi; Hideo Muramatsu, Shinshiro; Toshio Tsuboi, Okazaki; Hiroaki Hamano, Osaka; Shigenobu Fukushima, Toyokawa; Kanako Hamano, Osaka, all of Japan

[73] Assignee: Minolta Camera Kabushiki Kaisha, Osaka, Japan

[21] Appl. No.: 914,059

[22] Filed: Jul. 13, 1992

Related U.S. Application Data

[63] Continuation of Ser. No. 575,297, Aug. 30, 1990, abandoned.

[30] Foreign Application Priority Data

Aug. 31, 1989 [JP]  Japan ................................ 1-226693

[51] Int. Cl.$^5$ ............................................. H04N 1/46
[52] U.S. Cl. ................................. 358/500; 358/435; 358/436; 358/437
[58] Field of Search .................... 358/75, 77, 435, 436, 358/438

[56] References Cited

U.S. PATENT DOCUMENTS

| | | | |
|---|---|---|---|
| 3,751,582 | 8/1973 | Wernikoff et al. | 358/438 |
| 4,000,371 | 12/1976 | Ogawa | 358/435 |
| 4,580,889 | 4/1986 | Hiranuma et al. | 358/75 |
| 4,622,582 | 11/1986 | Yamada | 358/438 |
| 4,967,288 | 10/1990 | Mizutori et al. | 358/435 |
| 4,991,028 | 2/1991 | Kokubu | 358/438 |
| 5,022,072 | 6/1991 | Sakakibara et al. | 358/435 |

FOREIGN PATENT DOCUMENTS 63-197966  8/1988  Japan .

*Primary Examiner*—Jose L. Couso
*Attorney, Agent, or Firm*—Willian Brinks Olds Hofer Gilson & Lione

[57] ABSTRACT

A facsimile apparatus capable of processing the image information receiving from a particular transmitter in a mode different from the usual mode of processing image information receiving to distinguish the communication from the particular transmitter from those transmitted by others immediately. For example, the image information receiving from the particular transmitter is recorded on different kind of paper from usual image information recording paper, or recorded in different color from usual image information recording color, or the paper recorded the image information from particular transmitter is discharged onto different tray from the tray onto which usual image information recording paper is discharged.

12 Claims, 9 Drawing Sheets

FACSIMILE APPARATUS CAPABLE OF DISTINGUISHING THE COMMUNICATION FROM A PARTICULAR TRANSMITTER

This application is a continuation of application Ser. No. 07/575,297, filed Aug. 30, 1990 now abandoned.

BACKGROUND OF THE INVENTION

1. Field of the Invention

The present invention relates to a facsimile apparatus adapted to enable the operator to readily identify communications from a particular transmitter or particular person.

2. Description of the Related Art

With conventional facsimile apparatus, sheets of paper recording received data are all discharged onto one tray although the data is received from different transmitters.

Further since common facsimile apparatus are connected to the telephone network, the location where the apparatus is to be installed is considerably limited. In a place of business where a plurality of facsimile apparatus are used, the space available is limited, so that the apparatus are collectively installed generally in a facsimile room or in the corner of a room.

Especially, business firms or like organizations receive from transmitters in different locations a very large number of facsimile documents, which are likely to become stacked up on a tray notwithstanding that the transmitters are different. The documents received must therefore be sorted out promptly. Naturally, the larger the number of received documents, the more cumbersome is the sorting work. Moreover, it is difficult for the operator to distinguish one document from another by glacing at the recording paper. This imposes an increased burden on the operator.

Facsimile is used generally for urgent communications in view of its function. On the other hand, it is likely that a person will have to wait for an urgent facsimile communication while working at a location a large distance away from the facsimile apparatus as installed in a wide space. In such a case, he must leave his place of work to check from time to time whether the contemplated communication has been received. If otherwise, there arises a need to assign an attendant exclusively to the facsimile service for giving notice of received communication.

SUMMARY OF THE INVENTION

The main object of the present invention is to provide a facsimile apparatus which distinguishes the communication from a particular transmitter from those transmitted by others immediately.

Another object of the present invention is to provide a facsimile apparatus which is adapted to process the facsimile communication received from a particular transmitter in a mode different from the usual mode of processing communications.

These and other objects of the present invention are accomplished by providing a facsimile apparatus comprising memory means for storing a particular transmitter, distinction means for distinguishing the transmitter when data is received, and control means for changing the receiving process to be executed for the received data when the transmitter distinguished by the distinction means is found to match the transmitter stored in said memory means.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Embodiments of the present invention will be described below with reference to the accompanying drawings.

Construction of Facsimile Apparatus

Figure 1:
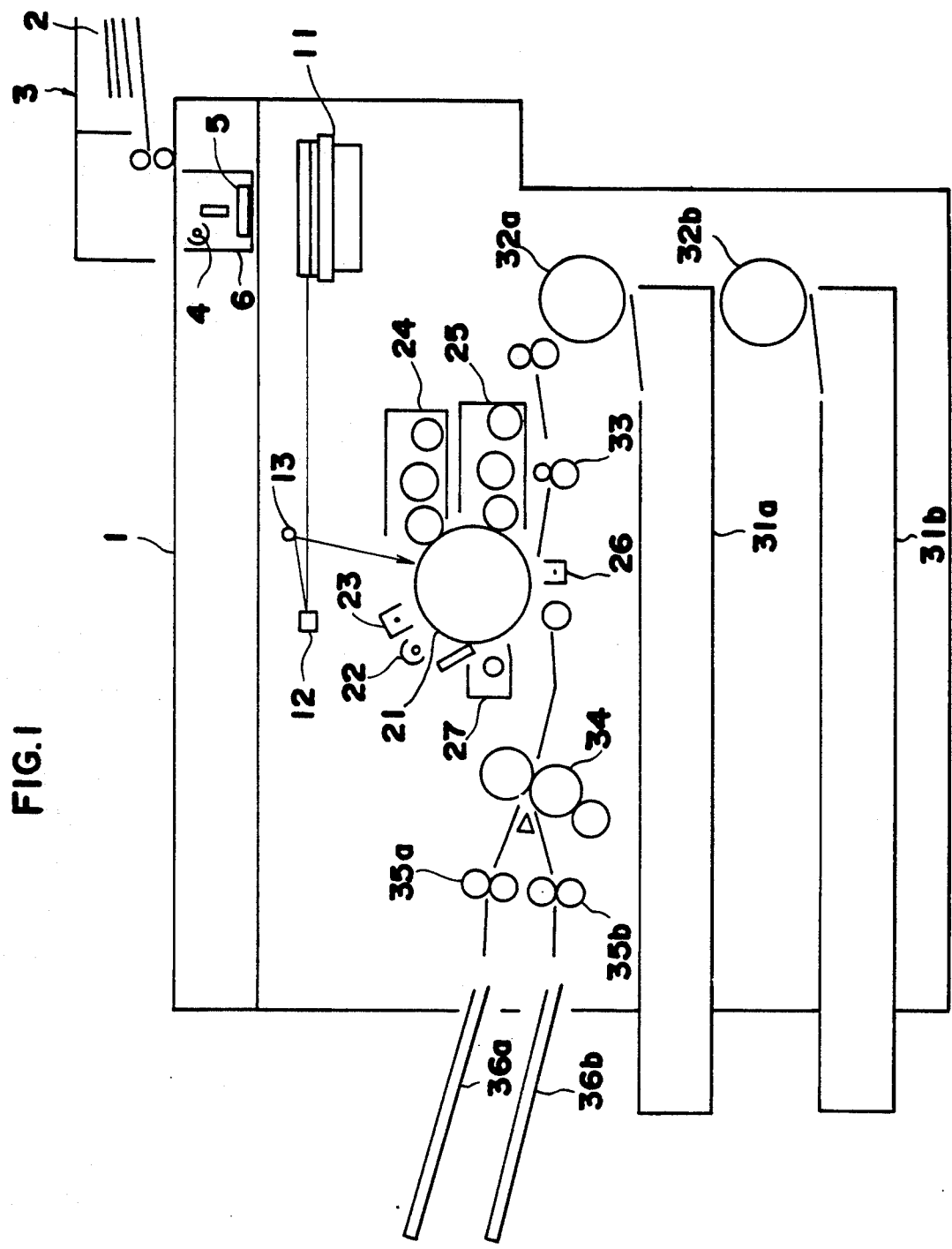
FIG. 1 is a sectional view schematically showing a two-color laser facsimile apparatus.

FIG. 1 is a sectional view showing the construction of a two-color laser facsimile apparatus embodying the invention. The apparatus has a reader at its upper portion for reading the document to be transmitted, and a recorder disposed below the reader for recording the data received.

The reader comprises a feeder 3 for feeding documents 2 onto a platen 1, and a scanning unit 6 for reading the document 2 on the platen 1 by scanning with an image sensor 5 while illuminating the document with an exposure lamp 4.

The recorder is adapted to practice a two-color electrophotographic process. An optical system 11 comprising a semiconductor laser and a polygonal mirror modulates a laser beam in accordance with recorded data and emits the modulated laser beam, which is reflected from reflecting mirrors 12, 13 and then projected on a photosensitive member 21 on a drum to form a latent image. Arranged around the photosensitive member 21 are an eraser lamp 22, sensitizing charger 23, first developing unit 24, second developing unit 25, transfer charger 26 and cleaner 27. The recorder operates in the same manner as when practicing the usual electrophotographic process except that it has two developing units 24, 25. Black toner is used for the second developing unit 25 for developing images in black. Usually the second developing unit 25 is selected. A color toner other than the black toner is used for the first developing unit 24 to develop images with the color toner when a color select key is depressed as will be described later. For recording, the photosensitive member 21, which is drivingly rotated, is irradiated by the eraser lamp 22 and then uniformly charged by the charger 23. In this state, the member 21 is exposed to light to form a latent image thereon. The latent image is developed by the developing unit 24 or 25, and then transferred onto paper by the transfer charger 26. The toner portion remaining on the photosensitive member 21 is thereafter removed by the cleaner 27.

Sheets of paper are accommodated in an upper cassette 31a and a lower cassette 31b, from which the paper is sent out by an upper feed roller 32a and a lower feed roller 32b, respectively. The paper sent out is fed to the transfer station, as timed with the exposure by a timing roller 33. The toner image transferred to the paper is fixed thereto by a fixing roller 34, whereupon the paper is delivered onto an upper paper tray 36a by an upper discharge roller 35a or onto a lower paper tray 36b by a lower discharge roller 35b. The paper contained in the upper cassette 31a is different from the paper in the lower cassette 31b in kind (e.g., in color or size).

Usually, the upper paper tray 36a is selected as a paper outlet in preference, and the paper is discharged onto the tray 36a. When a predetermined number of sheets of paper have been delivered onto the upper tray 36a, the paper outlet is automatically changed over to the lower paper tray 36b for receiving the discharged paper. When a recording mode is set by the transmitter distinction key to be described, a transmitter distinguishing process wherein the developing color, kind of paper, or paper tray is changed is executed for receiving facsimile data from a particular transmitter by selecting the first or second developing unit for development, the upper or lower feed roller for paper feeding, or the upper or lower discharge roller for paper discharge. When the apparatus is in this recording mode, the transmitter distinguishing process is practiced in preference to the usual receiving process. More specifically stated, upon receiving data from the particular transmitter in the recording mode, the change of developing color, change of kind of paper, or change of paper tray is selected.

The operation for controlling the facsimile apparatus will be described next.

Figure 2:
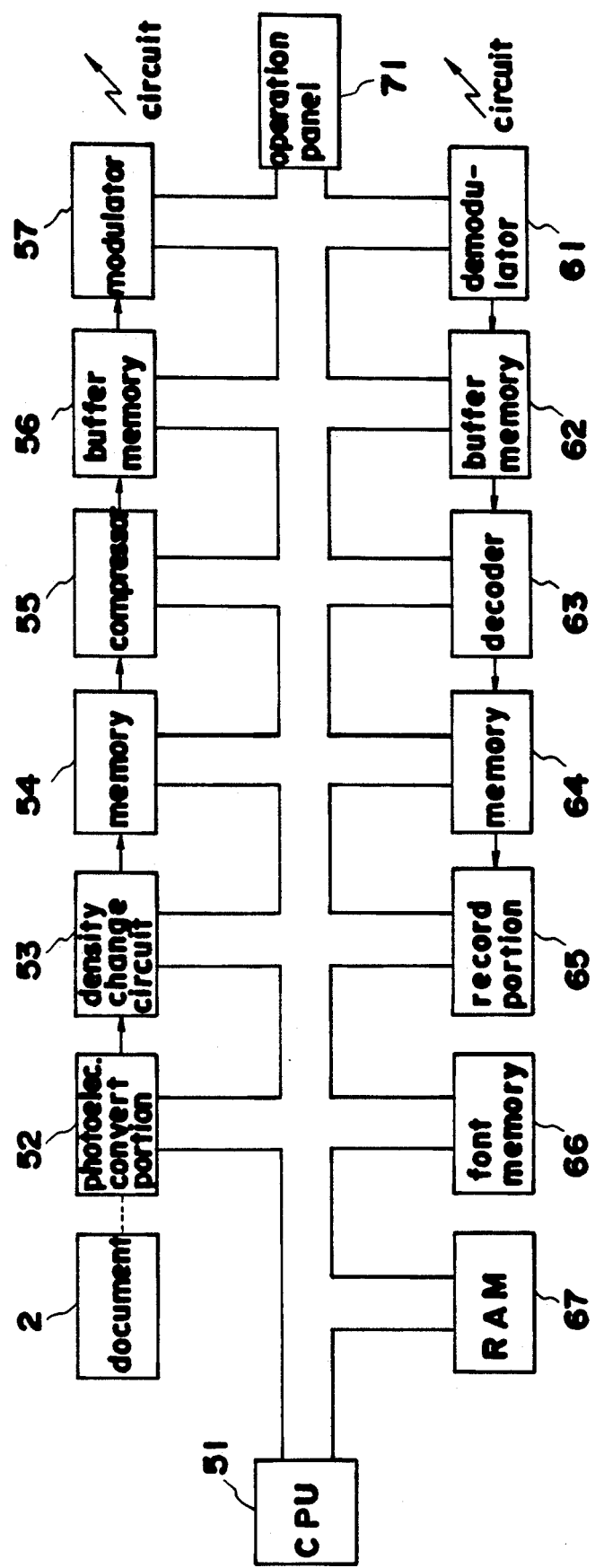
FIG. 2 is a circuit diagram of a system for controlling the facsimile apparatus.

With reference to FIG. 2, a CPU 51 controls the operation of the facsimile apparatus. When a document 2 is read, the image of the document 2 is converted to electric signals by a photoelectric converter 52 including the image sensor 5 and then fed to a density change circuit 53, in which the signal density is changed to a predetermined density. The data is thereafter stored in a memory 54. The data in the memory 54 is subsequently compressed to a predetermined form by a compressor 55 and thereafter stored in a buffer memory 56. Next, the data in the buffer memory 56 is modulated by a modulator 57 and transmitted via an external circuit.

For recording facsimile data, on the other hand, the data received from the external circuit is demodulated by a demodulator 61 and then stored in a buffer memory 62. The data in the buffer memory 62 is decoded in a specified form by a decoder 63 and thereafter sent to a memory 64. The data in the momory 64 is used for modulating a laser beam by the optical system 11 of a recording unit 65. The CPU 51 further controls the electrophotographic process to be practiced by the apparatus for writing data with the laser beam.

Figure 3:
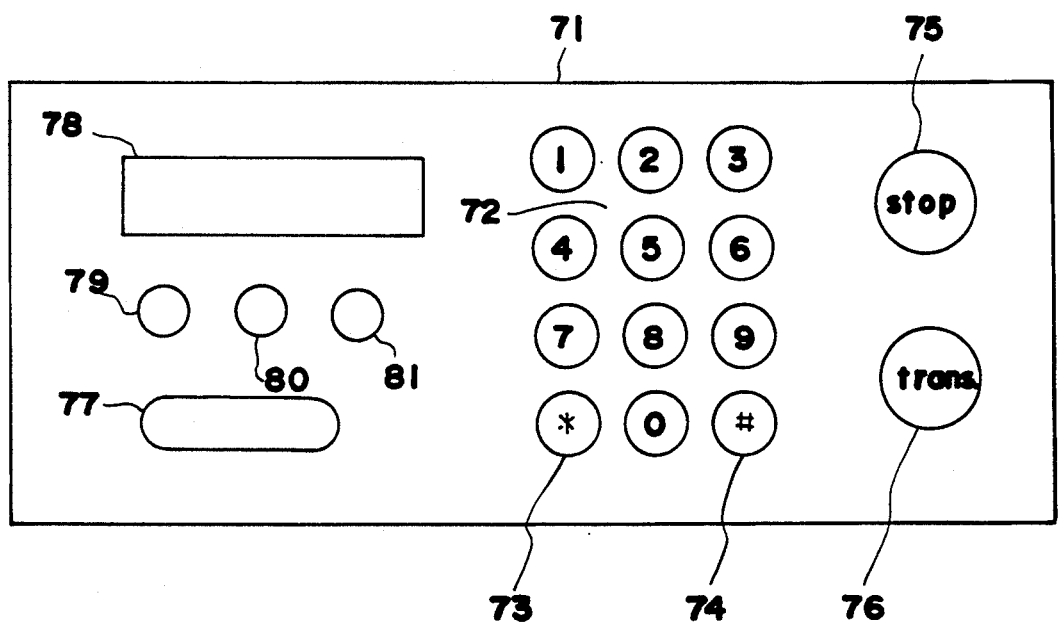
FIG. 3 is a plan view of an operation panel.

A font memory 66 is used for converting character codes to bit data, and a RAM 67 for registering and storing the number of the particular transmitter and the telephone number of the person (ultimate destination or addressee of the facsimile document) to be given a notice according to the invention. With the present embodiment, a TSI signal in the facsimile standard protocol is used as the particular transmitter number. The RAM 67 is used also for storing the numbers to be entered by a push-button dial or the like. An operation panel 71 is used for the registration. FIG. 3 shows the operation panel 71, which is provided with keys including usual numerical keys 72 for entering "0" to "9", "*" key 73, "#" key 74, "STOP" key 75, "TRANSMISSION" key 76 and registration key 77 for registering the particular transmitter number, a liquid crystal display 78 for presenting the addressee telephone number, operation procedures, etc., an indicator 79 for indicating that the particular transmitter number has been stored, a transmitter distinction key 80 for selecting the transmitter distinguishing process, and a color selection key 81 for specifying color development for the usual process.

Control Flow of Facsimile Apparatus

Figure 4:
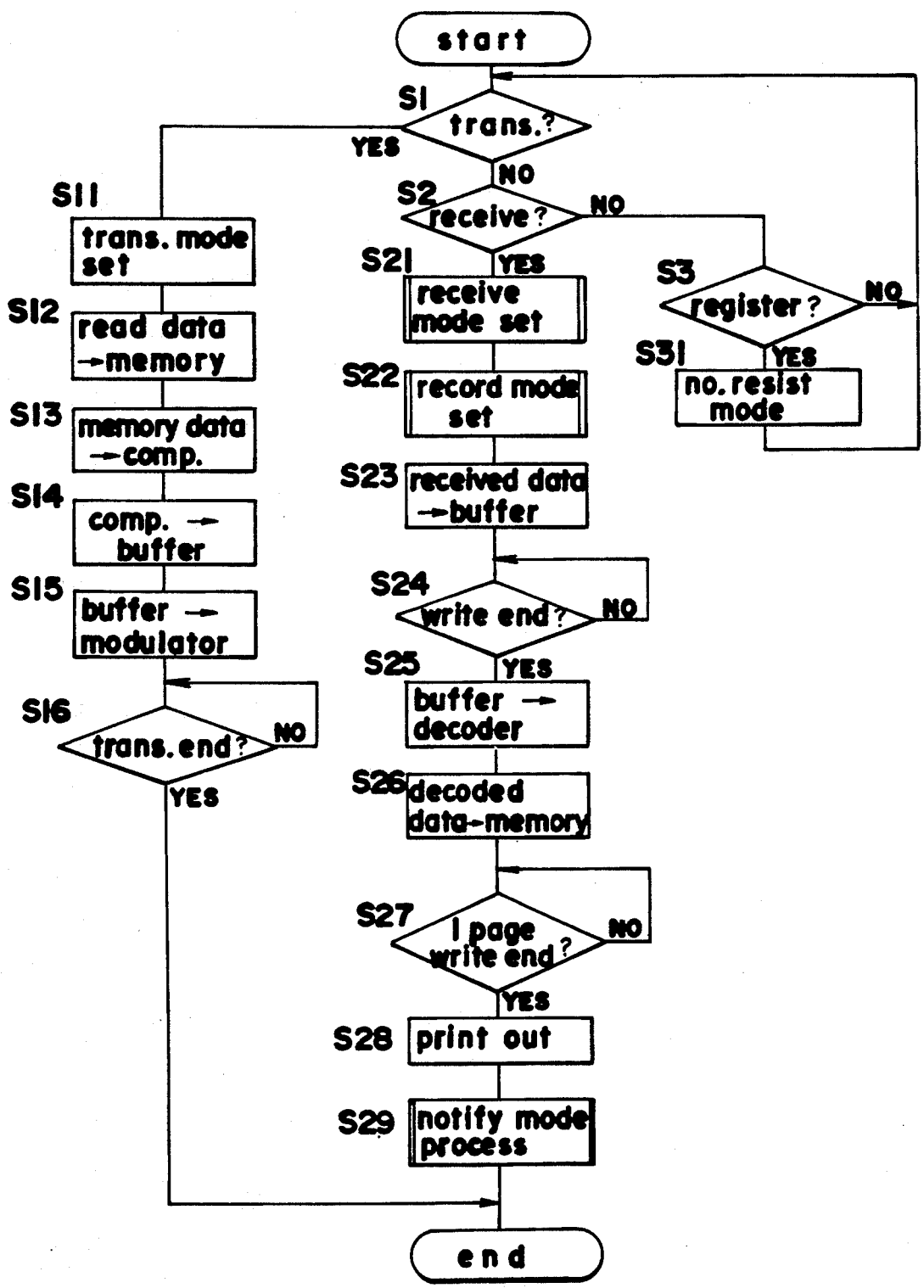
FIG. 4 is a flow chart showing a process for controlling the facsimile apparatus.

FIG. 4 is a flow chart showing the facsimile apparatus control operation to be performed by the CPU 51.

First, an inquiry is made as to whether the TRANSMISSION key 76 has been depressed (step S1, "step" will be omitted hereinafter). When transmission is commanded, a transmission mode is processed (S11 to S16). If otherwise, an inquiry is made as to whether a communication has been received (S2). If the answer is affirmative, a receiving mode is processed (S21 to S29). When no communication has been received or is to be transmitted, an inquiry is made as to whether number registration is to be made (S3). The command for number registration is given by depressing the registration key 77. When number registration is to be made, a number registering mode is processed (S31). If otherwise, the sequence returns to S1.

In the transmission mode, the system is initialized for this mode first (S11), whereupon a document 2 is fed onto the platen 1 and scanned by the scanning unit 6 for the photoelectric converter 52 to read the image of the document. The data read is stored in the memory 54 (S12), compressed by the compressor 55 (S13) and then stored in the buffer memory 56 (S14). Subsequently, the data in the buffer memory 56 is modulated by the modulator 57 (S15) and transmitted via the external circuit. On completion of transmission (S16), the transmission process is completed.

In the receiving mode, the system is initialized for this mode (S21), followed by recording mode setting (S22). While recording mode setting will be described in detail below, the apparatus in this mode is so adapted that if facsimile data is received from the particular transmitter with the transmitter distinction key 80 on, the operator can identify the data by glancing at the outlet for discharging the paper recording the received data, the color of the record, or the size or color of the paper. The received data is demodulated by the demodulator 61 and then stored in the buffer memory 62 (S23). On completion of data storage (S24), the data is transferred from the memory 62 to the decoder 63 for decoding (S25) and written in the memory 64 (S26). When data for one page has been written (S27), the recording unit 65 prints out the data (S28), whereupon a notifying mode is processed (S29) to give notice to the effect that data has been received from the particular transmitter. The receiving mode is completed with this step.

For the number registering process, the number registering mode is set (S31), in which the RAM 67 registers the particular transmitter number and the telephone number of the addressee to be notified of the receiving of facsimile data from the particular transmitter.

Number Registering Mode

Figure 5:
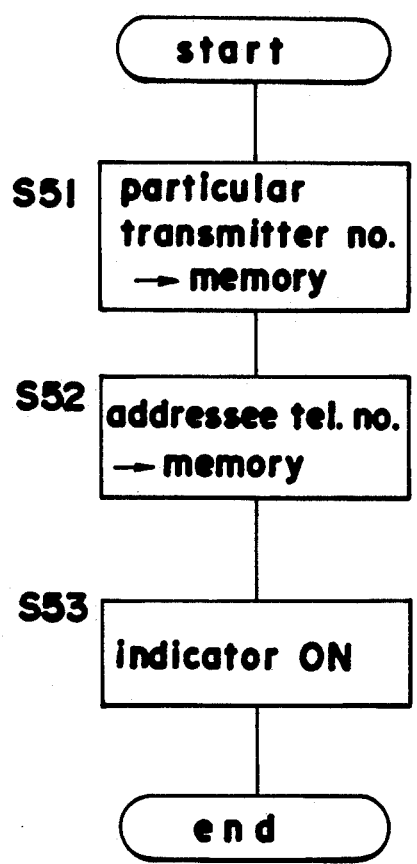
FIG. 5 is a flow chart of a number registering mode.

FIG. 5 shows the flow of the number registering mode (S31) in FIG. 4.

In this flow, the operator keys in the particular transmitter number (S51) and the addressee telepone number (S52) from the operation panel 71. The indicator 79 is turned on to indicate the completion of registration (S53).

It is possible to register the numbers of a plurality of particular transmitters and the telephone numbers of a plurality of addressees to be given notice.

Receiving Mode Setting

Figure 6:
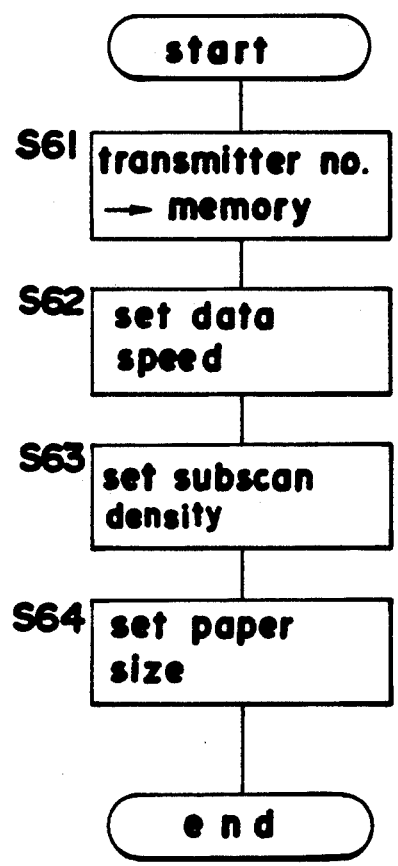
FIG. 6 is a flow chart of a receiving mode setting.

FIG. 6 shows the flow of the receiving mode setting step (S21) in FIG. 4.

First, the number of the transmitter forwarded by the TSI signal in the standard protocol from the transmitter is stored in the RAM 67 (S61), and the apparatus is set to a data speed (S62), subscanning density (S63) and paper size (S64) in accordance with other data from the transmitter.

Recording Mode Setting

Figure 7A:
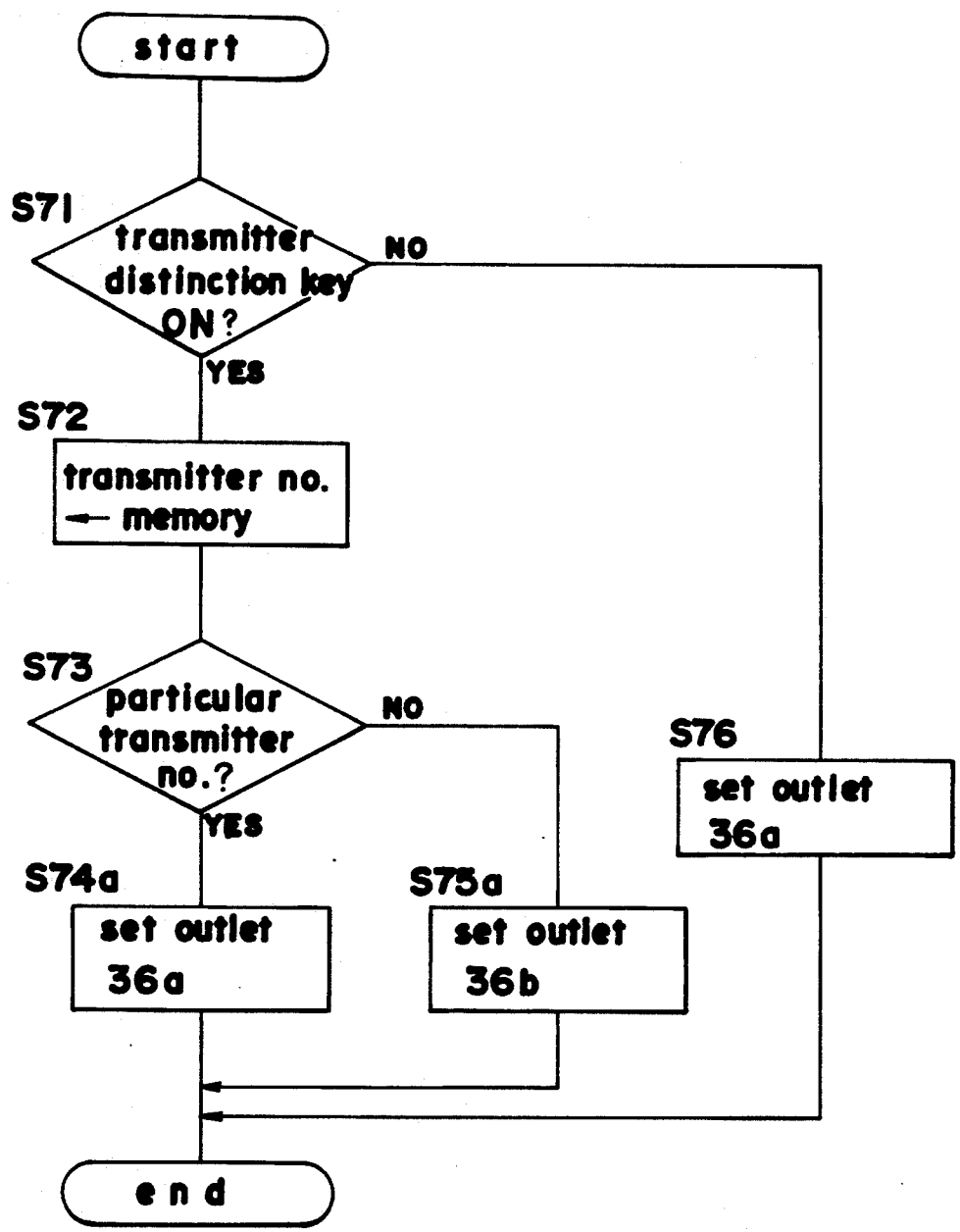
FIGS. 7 (a), (b) and (c) are flow charts showing examples of recording mode setting.
Figure 7B:
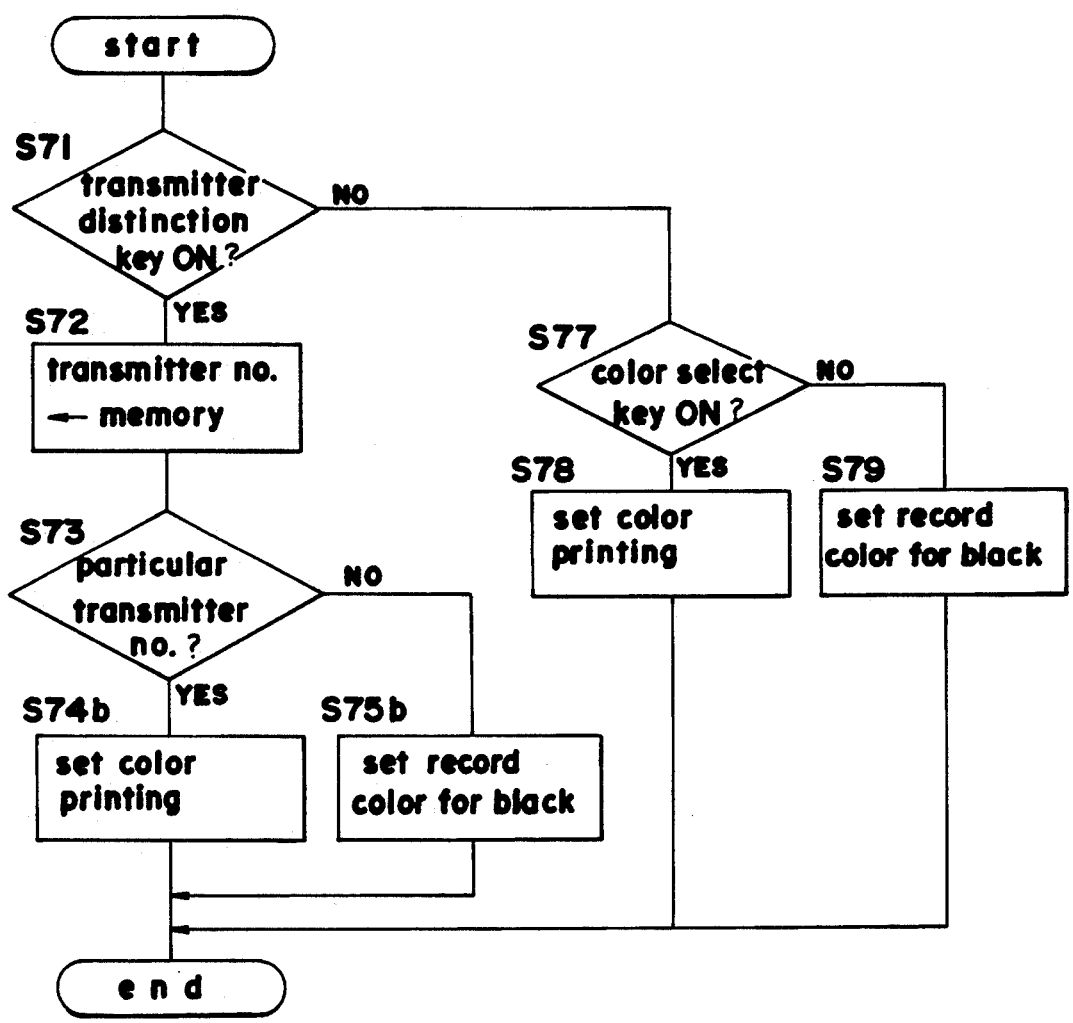
Figure 7C:
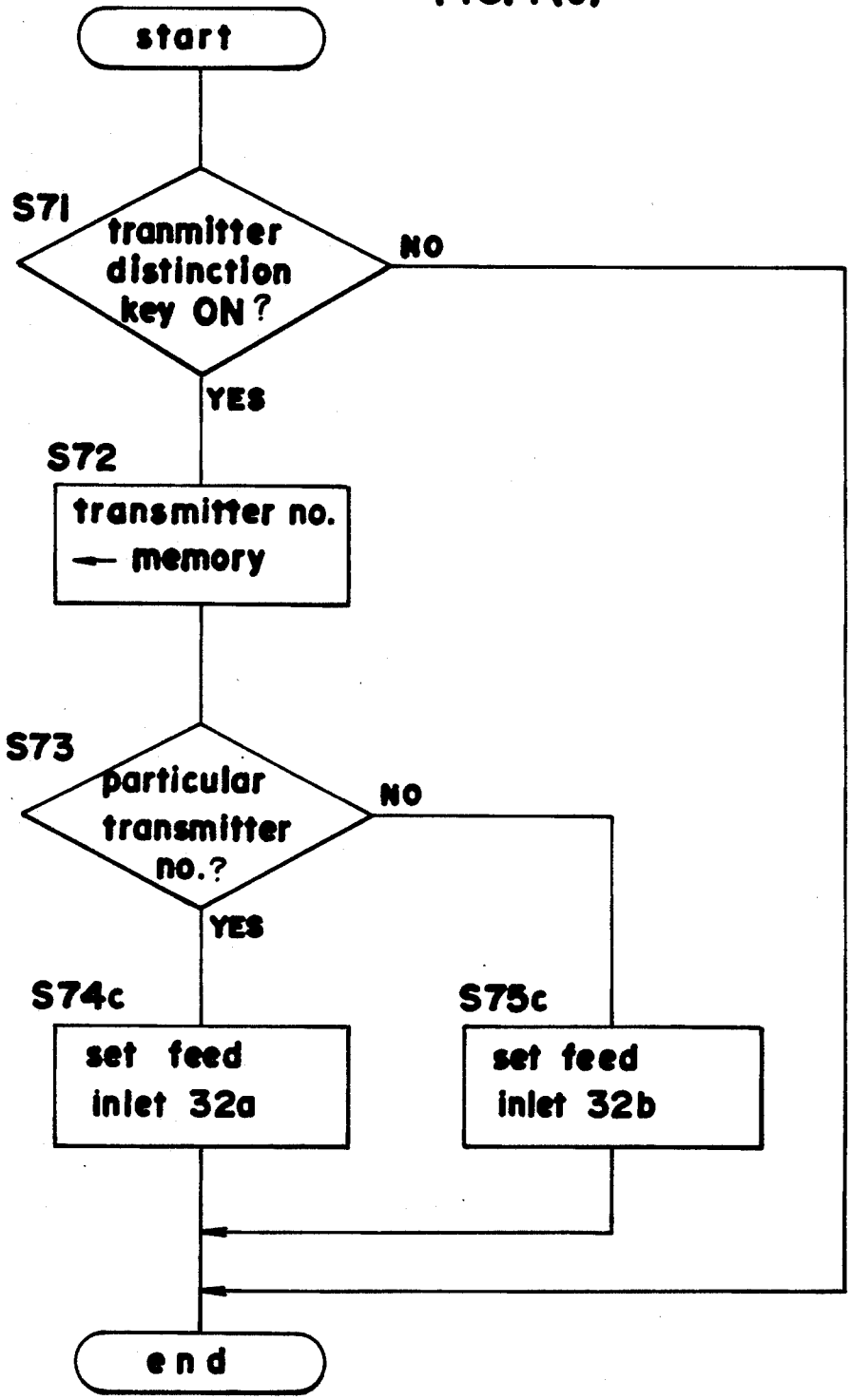

FIGS. 7 (a), (b) and (c) show flows of recording mode setting step (S22) in FIG. 4. The processes of these drawings are characterized in that the depression of the transmitter distinction key enables the operator to recognize the facsimile data received from the particular transmitter by casting a glance at the paper recording the received data. Three examples are given for realizing this.

FIG. 7 (a) shows a procedure wherein the paper recording the data received from the particular transmitter is discharged to a specified paper outlet. Thus, the sheets of paper recording the data from the particular transmitter are stacked up on the tray at the specified outlet, so that these sheets alone can be sorted out immediately.

When the transmitter distinction key 80 is found to be on in S71, i.e., when the transmitter distinguishing mode is selected, the transmitter number stored in the receiving mode setting step S61 of FIG. 6 is retrieved from the memory 67 first (S72). If the number is found to match one of the particular transmitter numbers registered in the number registering mode in FIG. 5 (S73), the paper outlet 36a is selected for discharging the paper recording the received data (S74a). If otherwise, the discharge outlet 36b is selected for discharging the recording paper (S75a). When the transmitter distinction key 80 is found to be off in S71, i.e., when the transmitter distinguishing mode is not selected, the paper outlet 36a is selected for discharging the received data recording paper (S76).

FIG. 7 (b) shows a flow wherein the data received from the particular transmitter is recorded in a predetermined color (other than black in the present example). Thus, the data from the particular transmitter is recorded in the color different from the usual one used for other data received, with the result that the paper recording the data from the particular transmitter only can be readily sorted out.

When the transmitter distinction key 80 is found to be on in S71, i.e., when the transmitter distinguishing mode is selected, the transmitter number stored in the receiving mode setting step S61 in FIG. 6 is retrieved first (S72). If the number is found to match one of the particular transmitter numbers registered in the number registering mode in FIG. 5 (S73), the predetermined recording color is selected (S74b). If otherwise, black is selected for recording (S75b). When the transmitter distinction key 80 is found to be off in S71, i.e., when the transmitter distinguishing mode is not selected, S77 checks whether the color select key 81 is on. If the key is on, the color is selected for recording (S78). If the key is off, black is selected for recording (S79).

FIG. 7 (c) shows a flow wherein when data is received from the particular transmitter, the paper for recording the data is fed from a specified paper inlet. The paper to be fed from the specified inlet is made different from the paper to be fed from the other inlet in color or size. Even if the data recording paper is stacked up on one tray, the paper bearing the data from the particular transmitter can then be readily distinguished.

When the transmitter distinction key 80 is found to be on in S71, i.e., when the transmitter distinguishing mode is selected, the transmitter number stored in the receiving mode setting step S61 in FIG. 6 is retrieved first (S72). If the number is found to match one of the particular transmitter numbers registered in the number registering mode in FIG. 5 (S73), 32a is selected as the feed inlet (S74c). If otherwise, 32b is selected as the feed inlet (S75c). When the transmitter distinction key 80 is found to be off in S71, i.e., if the transmitter distinguishing mode is not selected, the recording mode setting process is completed with this step.

Notifying Mode Process

Figure 8:
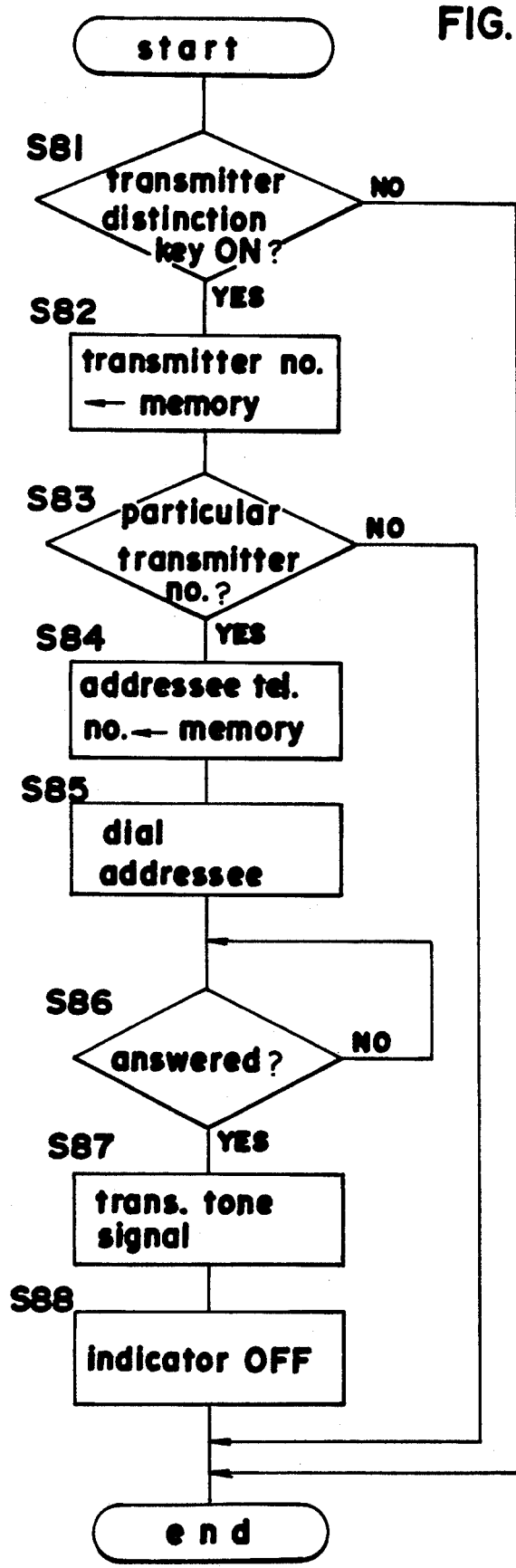
FIG. 8 is a flow chart of a notifying mode.

FIG. 8 shows the flow of the notifying mode process (S29) in FIG. 4. The notifying mode process is such that when data has been completely received from the particular transmitter, the person waiting for the data from the particular transmitter is notified of the receiving of the data. With the present embodiment, the telephone is used for giving notice. Since the facsimile apparatus is connected to the telephone circuit, the telephone circuit is made usable for notification inexpensively by slightly modifying the conventional device. However, the present invention is not limited to this method of notification; a sound or light may be produced for notification.

First, in the case where the transmitter distinction key 80 is found to be on in S81, i.e., when the transmitter distinguishing mode is selected, the number of the transmitter from which the data is received is retrieved from the memory (S82). This number has been stored in the receiving mode setting step of FIG. 6. When the number of the transmitter of data received is found to match the retrieved number (FIG. 8, S83), telephone number of the addressee to be given notice and stored in the number registering mode of FIG. 5, S52 is retrieved (S84), and the telephone number is dialed (S85). When the call is answered (S86), a tone signal or recorded message is transmitted (S87) to notify that data has been received from the particular transmitter. The indicator 79 is then turned off (S88) to show that the particular transmitter number can be registered again. If the transmitter distinction key 80 is found to be off in S81, i.e., when the transmitter distinguish-mode is not selected, the notifying mode process is completed with this step.

Although the transmitter distinguishing process is executed only when the transmitter distinction key is depressed according to the foregoing embodiment, this key is not always essential to the present invention. For example, if the facsimile apparatus itself has the particular transmitter number input therein, the apparatus may be made to automatically perform S72 and the following steps of FIG. 7 (a), (b) or (c).

Although the facsimile apparatus of the forgoing embodiment has a plurality of developing devices, paper inlets and paper outlets, it is not always essential to have all of them to the present invention. For example, even if a facsimile apparatus has just a plurality of developing devices, the apparatus is capable of being made to readily identify communications from the particular transmitter or particular person just like the above-mentioned embodiment.

Although the above embodiment is adapted to change one of the paper inlet, paper outlet and developing unit and to give notice to the specified person or addressee upon receiving a communication from the particular transmitter, the invention is not limited to this embodiment. Various methods are usable for the same purpose utilizing the construction and function of the facsimile apparatus. For example, a predetermined alarm sound of display is usable for notifying the worker of the receiving of data from the particular transmitter.

Although the TSI (Transmitting Station Identification) signal in the facsimile standard protocol based on an advice of CCITT is used for registering and storing the particular transmitter number in the above embodiment, the use of this signal is not limitative but an NSS (Non-Standard Facilities Set Up) signal according to a unique protocol may be used for the particular transmitter number.

Furthermore, the NSS signal may be used for the transmitter to transmit an optional code instead of the number and for the receiver to identify the particular transmitter with reference to the code. It is then possible, for example, for a plurality of particular transmitters specified to use a common code for transmission, such that when the common code is merely registered in the receiving apparatus, the facsimile communication received from any of these specified transmitters can be processed in a mode different from the usual mode of processing communications from other transmitters. This serves to simplify the procedure needed for individually registering the numbers of respective specified transmitters and permits use of a memory of smaller capacity.

While the data transmitted from the particular transmitter is identified with reference to the transmitter number, that is, by distinguishing the particular transmitter from the other transmitters according to the above embodiment, it is also possible for the receiver to identify the data transmitted from a particular person instead of resorting to the discrimination between transmitter stations. This can be realized by inputting in the receiving facsimile apparatus a specified ID code instead of the transmitter number of the embodiment for the receiving apparatus to process the received deta in a changed mode only when receiving the ID code as input by the transmitter operator.

The data, such as the transmitter number, optional code or ID code described above, for distinguishing the particular transmitter may be transmitted as image data along with document images so that the apparatus processes the document images in the same manner as the present embodiment upon recognizing the image data portion identifying the particular transmitter.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus capable of receiving image signals for outputting in a form of readable images comprising:
   memory means for storing indicative of the identity of preselected particular transmitters from which image signals may be received by said facsimile apparatus;
   printing means for printing received image information from a transmitter on a printing paper, said printing means being operable in a first usual image information printing manner and in a second image information printing manner different from said first usual image information printing manner; and
   control means for controlling said printing means to print image information in said first usual image information printing manner when data indicative of the identity of a transmitter of received image information does not correspond to the data indicative of the identity of any one of said preselected particular transmitters stored by said memory means, and to print image information in said second image information printing manner when data indicative of the identity of a transmitter of received image information corresponds to the data indicative of the identity of any one of said preselected particular transmitters stored by said memory means.

2. A facsimile apparatus comprising:
   means for receiving image information;
   first memory means for storing data indicative of the identity of preselected particular transmitters from which image signals may be received by said facsimile apparatus;
   second memory means for storing data indicative of the identity of an image information transmitter from which image information is actually received;
   printing means for printing received image information on a printing paper; and
   control means for controlling said printing means to print image information in a first usual image information printing manner when the data stored by said second memory means does not correspond to the data indicative of the identity of any one of the preselected particular transmitters stored by said first memory means, and in a second image information printing manner different from said first usual image information printing manner when data stored by said second memory means corresponds to data indicative of the identity of any one of the preselected particular transmitters stored by said first memory means.

3. The facsimile apparatus as claimed in claim 2, wherein said printing means includes a first and a second discharge means and said control means controls said printing means to discharge recording papers from said first discharge means in said first usual image information printing manner, and from said second discharge means in said second image information printing manner different from said first usual image information printing manner.

4. The facsimile apparatus as claimed in claim 2, wherein said printing means includes a first developing means and a second developing means including different color toner from toner in said first developing means, and wherein said control means controls said printing means to develop recording papers by the first developing means in said first usual image information printing manner, and by the second developing means in said second image information printing manner different from said first usual image information printing manner.

5. The facsimile apparatus as claimed in claim 2, wherein said printing means includes a first feeding means and a second feeding means, and wherein said control means controls said printing means to feed recording papers from the first feeding means in said first usual image information printing manner, and from the second feeding means in said second image information printing manner different from said first usual image information printing manner.

6. The facsimile apparatus as claimed in claim 5, wherein said second feeding means includes recording papers different from recording papers in said first feeding means in size or color.

7. The facsimile apparatus as claimed in claim 2 further comprising notification means for notifying that image information receiving from one of the particular transmitter has been accomplished.

8. A facsimile apparatus capable of receiving image signals for outputting in a form of readable images comprising:

means for receiving image information;

memory means for storing data indicative of the identity of preselected particular transmitters from which image signals may be received by said facsimile apparatus;

distinction means for distinguishing whether data indicative of the identity of an image information transmitter corresponds to data indicative of the identity of any one of the preselected particular transmitters stored by said memory means when said receiving means receives image information from said image information transmitter;

first printing means for printing received image information in a first mode;

second printing means for printing received image information transmitted by any one of said preselected particular transmitters in a second mode different from said first mode; and control means for controlling said apparatus to print received image information by said first printing means when said distinction means judges that received image information is not from any one of said preselected particular transmitters, and to print received image information by said second printing means when said distinction means judges that received image information is from any one of said preselected particular transmitters.

9. The facsimile apparatus as claimed in claim 8, wherein said first printing means includes a first discharging means, and said second printing means includes a second discharging means.

10. The facsimile apparatus as claimed in claim 8, wherein said first printing means includes a first developing means, and said second printing means includes a second developing means including different color toner from toner in said first developing means.

11. The facsimile apparatus as claimed in claim 8, wherein said first printing means includes a first feeding means, and said second printing means includes a second feeding means which includes different recording papers from those in said first feeding means in size or color.

12. The facsimile apparatus as claimed in claim 8 further comprising notification means for notifying that the receiving of image information from one of said particular transmitters has been accomplished.

* * * * *

UNITED STATES PATENT AND TRADEMARK OFFICE
CERTIFICATE OF CORRECTION

PATENT NO. : 5,262,851

DATED : November 16, 1993

INVENTOR(S) : Munehiro Nakatani, et al.

It is certified that error appears in the above-indentified patent and that said Letters Patent is hereby corrected as shown below:

In col. 8, line 10, (claim 1, line 4), after "storing" insert --data--.

Signed and Sealed this

Twenty-sixth Day of April, 1994

BRUCE LEHMAN

Attest:

Attesting Officer

Commissioner of Patents and Trademarks